United States Patent
Chen et al.

(10) Patent No.: US 9,276,962 B2
(45) Date of Patent: Mar. 1, 2016

(54) METHOD AND SYSTEM FOR PORTING GATEWAY FUNCTIONALITY ASSOCIATED WITH A USER FROM A FIRST GATEWAY TO ONE OR MORE OTHER GATEWAYS

(75) Inventors: Xuemin Chen, Rancho Santa Fe, CA (US); Jeyhan Karaoguz, Irvine, CA (US); Wael William Diab, San Francisco, CA (US); David Garrett, Tustin, CA (US); David Albert Lundgren, Mill Valley, CA (US); Rich Prodan, Niwot, CO (US)

(73) Assignee: BROADCOM CORPORATION, Irvine, CA (US)

( * ) Notice: Subject to any disclaimer, the term of this patent is extended or adjusted under 35 U.S.C. 154(b) by 1043 days.

(21) Appl. No.: 12/982,353

(22) Filed: Dec. 30, 2010

(65) Prior Publication Data

US 2011/0299548 A1    Dec. 8, 2011

Related U.S. Application Data

(60) Provisional application No. 61/351,696, filed on Jun. 4, 2010.

(51) Int. Cl.
*H04L 12/28* (2006.01)
*H04L 29/06* (2006.01)
(Continued)

(52) U.S. Cl.
CPC .............. *H04L 63/205* (2013.01); *G05B 13/02* (2013.01); *G05F 1/66* (2013.01); *G06F 21/10* (2013.01); *G06Q 20/10* (2013.01); *G06Q 30/0215* (2013.01); *G06Q 30/0226* (2013.01); *G06Q 30/04* (2013.01); *G06Q 40/12* (2013.01); *H04L 12/1453* (2013.01); *H04L 12/66* (2013.01); *H04L 41/32* (2013.01); *H04L 47/2491* (2013.01); *H04L 63/0281* (2013.01); *H04L 63/10* (2013.01); *H04L 65/102* (2013.01); *H04L 65/40* (2013.01); *H04L 67/10* (2013.01); *H04L 67/1095* (2013.01); *H04L 67/12* (2013.01);
(Continued)

(58) Field of Classification Search
CPC ..... H04L 41/32; H04L 41/5019; H04L 12/12; H04L 12/2834
See application file for complete search history.

(56) References Cited

U.S. PATENT DOCUMENTS 7,254,645 B2 * 8/2007 Nishi ............................. 709/249
2006/0234678 A1 * 10/2006 Juitt et al. ..................... 455/411

(Continued)

*Primary Examiner* — Mounir Moutaouakil
(74) *Attorney, Agent, or Firm* — Foley & Lardner LLP; Christopher J. McKenna; Paul M. H. Pua

(57) ABSTRACT

A broadband gateway, which enables communication with a plurality of devices, handles at least one physical layer connection to at least one corresponding network access service provider. The broadband gateway may operate as a home gateway to negotiate with one or more visited gateways, a common authorized service area or domain (ASD) for providing services to the visited gateways. The home gateway may establish one or more corresponding communication links with the visited gateways based on the negotiated common ASD. The home gateway communicates corresponding content for the services to the visited gateways via the established corresponding communication links. The home gateway communicates information about gateway functionalities required for the services to the visited gateways. The visited gateways may port gateway functionalities forwarded by the home gateway, or may perform gateway functionality conversion to support the services, which may be acquired via the home gateway and/or the visited gateways from networks.

20 Claims, 6 Drawing Sheets

(51) Int. Cl.

| | |
|---|---|
| *H04W 12/08* | (2009.01) |
| *H04N 21/63* | (2011.01) |
| *G06Q 20/10* | (2012.01) |
| *H04L 12/24* | (2006.01) |
| *H04L 12/857* | (2013.01) |
| *G06Q 30/02* | (2012.01) |
| *G06F 21/10* | (2013.01) |
| *G06Q 40/00* | (2012.01) |
| *G05B 13/02* | (2006.01) |
| *G05F 1/66* | (2006.01) |
| *G06Q 30/04* | (2012.01) |
| *H04L 12/14* | (2006.01) |
| *H04L 12/66* | (2006.01) |
| *H04N 5/445* | (2011.01) |
| *H04N 21/482* | (2011.01) |
| *H04N 21/472* | (2011.01) |
| *H04L 29/08* | (2006.01) |

(52) U.S. Cl.
CPC ............ *H04N 5/445* (2013.01); *H04N 21/482* (2013.01); *H04N 21/632* (2013.01); *H04W 12/08* (2013.01); *G06F 2221/07* (2013.01); *H04L 41/5019* (2013.01); *H04L 65/4084* (2013.01); *H04L 67/104* (2013.01); *H04N 21/47202* (2013.01)

(56) References Cited

U.S. PATENT DOCUMENTS

| | | | |
|---|---|---|---|
| 2008/0151932 A1* | 6/2008 | Wormer et al. | 370/466 |
| 2009/0055267 A1* | 2/2009 | Roker | 705/14 |
| 2010/0128715 A1* | 5/2010 | Dei et al. | 370/352 |
| 2011/0116482 A1* | 5/2011 | Ansari | 370/338 |
| 2012/0311152 A1* | 12/2012 | Short et al. | 709/225 |
| 2013/0114589 A1* | 5/2013 | Fangman et al. | 370/352 |
| 2013/0276018 A1* | 10/2013 | Walter et al. | 725/25 |

\* cited by examiner

METHOD AND SYSTEM FOR PORTING GATEWAY FUNCTIONALITY ASSOCIATED WITH A USER FROM A FIRST GATEWAY TO ONE OR MORE OTHER GATEWAYS

CLAIM OF PRIORITY

This patent application makes reference to, claims priority to and claims benefit from U.S. Provisional Patent Application Ser. No. 61/351,696 filed on Jun. 4, 2010.

The above stated application is hereby incorporated herein by reference in its entirety

INCORPORATION BY REFERENCE

This application also makes reference to:
U.S. patent application Ser. No. 12/355,377 filed on Jan. 16, 2009;
U.S. patent application Ser. No. 12/355,413 filed on Jan. 16, 2009;
U.S. patent application Ser. No. 12/355,480 filed on Jan. 16, 2009;
U.S. patent application Ser. No. 12/395,383 filed on Feb. 27, 2009;
U.S. patent application Ser. No. 12/982,321 filed on Dec. 30, 2010;
U.S. patent application Ser. No. 12/982,355 filed on Dec. 30, 2010;
U.S. patent application Ser. No. 12/981,971 filed Dec. 30, 2010;
U.S. patent application Ser. No. 12/981,993 filed Dec. 30, 2010;
U.S. patent application Ser. No. 12/982,216 filed Dec. 30, 2010;
U.S. patent application Ser. No. 12/982,205 filed on Dec. 30, 2010;
U.S. patent application Ser. No. 12/982,433 filed Dec. 30, 2010;
U.S. patent application Ser. No. 12/981,966 filed Dec. 30, 2010;
U.S. patent application Ser. No. 12/982,453 filed Dec. 30, 2010;
U.S. patent application Ser. No. 12/982,172 filed Dec. 30, 2010;
U.S. patent application Ser. No. 12/982,429 filed Dec. 30, 2010;
U.S. patent application Ser. No. 12/981,990 filed Dec. 30, 2010;
U.S. patent application Ser. No. 12/982,442 filed Dec. 30, 2010;
U.S. patent application Ser. No. 12/982,000 filed Dec. 30, 2010;
U.S. patent application Ser. No. 12/982,010 filed Dec. 30, 2010;
U.S. patent application Ser. No. 12/982,022 filed Dec. 30, 2010;
U.S. patent application Ser. No. 12/981,986 filed Dec. 30, 2010;
U.S. patent application Ser. No. 12/982,236 filed Dec. 30, 2010;
U.S. patent application Ser. No. 12/982,091 filed Dec. 30, 2010;
U.S. patent application Ser. No. 12/982,213 filed Dec. 30, 2010;
U.S. patent application Ser. No. 12/982,166 filed Dec. 30, 2010;
U.S. patent application Ser. No. 12/982,340 filed Dec. 30, 2010;
U.S. patent application Ser. No. 12/982,073 filed Dec. 30, 2010;
U.S. patent application Ser. No. 12/982,501 filed Dec. 30, 2010;
U.S. patent application Ser. No. 12/982,206 filed Dec. 30, 2010;
U.S. patent application Ser. No. 12/982,440 filed Dec. 30, 2010;
U.S. patent application Ser. No. 12/982,171 filed Dec. 30, 2010;
U.S. patent application Ser. No. 12/982,223 filed Dec. 30, 2010;
U.S. patent application Ser. No. 12/982,305 filed Dec. 30, 2010;
U.S. patent application Ser. No. 12/982,477 filed Dec. 30, 2010;
U.S. patent application Ser. No. 12/982,331 filed Dec. 30, 2010;
U.S. patent application Ser. No. 12/982,036 filed Dec. 30, 2010;
U.S. patent application Ser. No. 12/982,196 filed Dec. 30, 2010;
U.S. patent application Ser. No. 12/982,196 filed Dec. 30, 2010;
U.S. patent application Ser. No. 12/982,405 filed Dec. 30, 2010;
U.S. patent application Ser. No. 12/982,405 filed Dec. 30, 2010;
U.S. patent application Ser. No. 12/982,414 filed Dec. 30, 2010; and
U.S. patent application Ser. No. 12/982,414 filed Dec. 30, 2010.

Each of the above stated applications is hereby incorporated herein by reference in its entirety.

FIELD OF THE INVENTION

Certain embodiments of the invention relate to broadband gateways. More specifically, certain embodiments of the invention relate to a method and system for porting gateway functionality associated with a user from a first gateway to one or more other gateways.

BACKGROUND OF THE INVENTION

With the continuous growth of digital television or broadcast multimedia, and/or broadband access, which may be used in conjunction with online businesses, social networks, and/or other online services and applications, users may desire having access to a larger number of providers and/or a broader range of content in a manner that is flexible and/or suits the users' lifestyles. Most users connect to the Internet using web browsers running on personal computers (PCs). Furthermore, most households may have one or more televisions that may be used to view television and/or multimedia broadcasts. Television broadcasts may include terrestrial TV, Cable-Television (CATV), satellite TV and/or Internet Protocol television (IPTV) based broadcasts. To ensure against unauthorized reception and/or use of TV and/or multimedia broadcast, service providers may require use of dedicated set-top boxes (STBs) that may be used to encrypt broadcast signals communicated from the service providers to generate suitable video and/or audio streams that may be played via televisions and/or other display/playback devices in the household. Furthermore, STBs and/or TVs may support Internet access. Thus, rather than using a computer to access the Internet, a user may find it more convenient to use the flat screen televisions and/or monitors in homes for the same purpose. To do so, for example, an STB connected to a flat screen television may be provided with web browsing software and protocols, and Internet connectivity, which may enable the user to easily access the Internet or check their electronic mail (email), for example, from a convenient and comfortable location such as their living room.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for porting gateway functionality associated with a user from a first gateway to one or more other gateways, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for porting gateway functionality associated with a user from a first gateway to one or more other gateways. In various embodiments of the invention, a broadband gateway, which enables communication with a plurality of devices, is operable to handle at least one physical layer connection to at least one corresponding network access service provider. In this regard, the at least one physical layer connection may comprise a plurality of physical layer connections and the at least one corresponding network access service provider may comprise a plurality of access service providers. Each of the plurality of physical layer connections may correspond to a respective one of the plurality of access service providers. In various exemplary embodiments of the invention, a home gateway may be operable to negotiate with one or more other visited gateways, a common authorized service area or domain (ASD) for providing one or more services from the home gateway to the visited gateways. The home gateway may establish one or more corresponding communication links or connections to the visited gateways based on the negotiated common ASD. The home gateway may communicate corresponding content for the services to the visited gateways via the established corresponding communication links. The negotiated common ASD may comprise information such as security features. The home gateway may communicate information about gateway functionalities required for the services to the visited gateways. The home gateway may forward or push a portion of the gateway functionalities required for the services to the visited gateways. The visited gateways may port the forwarded gateway functionalities or may perform gateway functionality conversion to support the services, which may be acquired from corresponding networks by the home gateway and/or the visited gateways.

Figure 1:
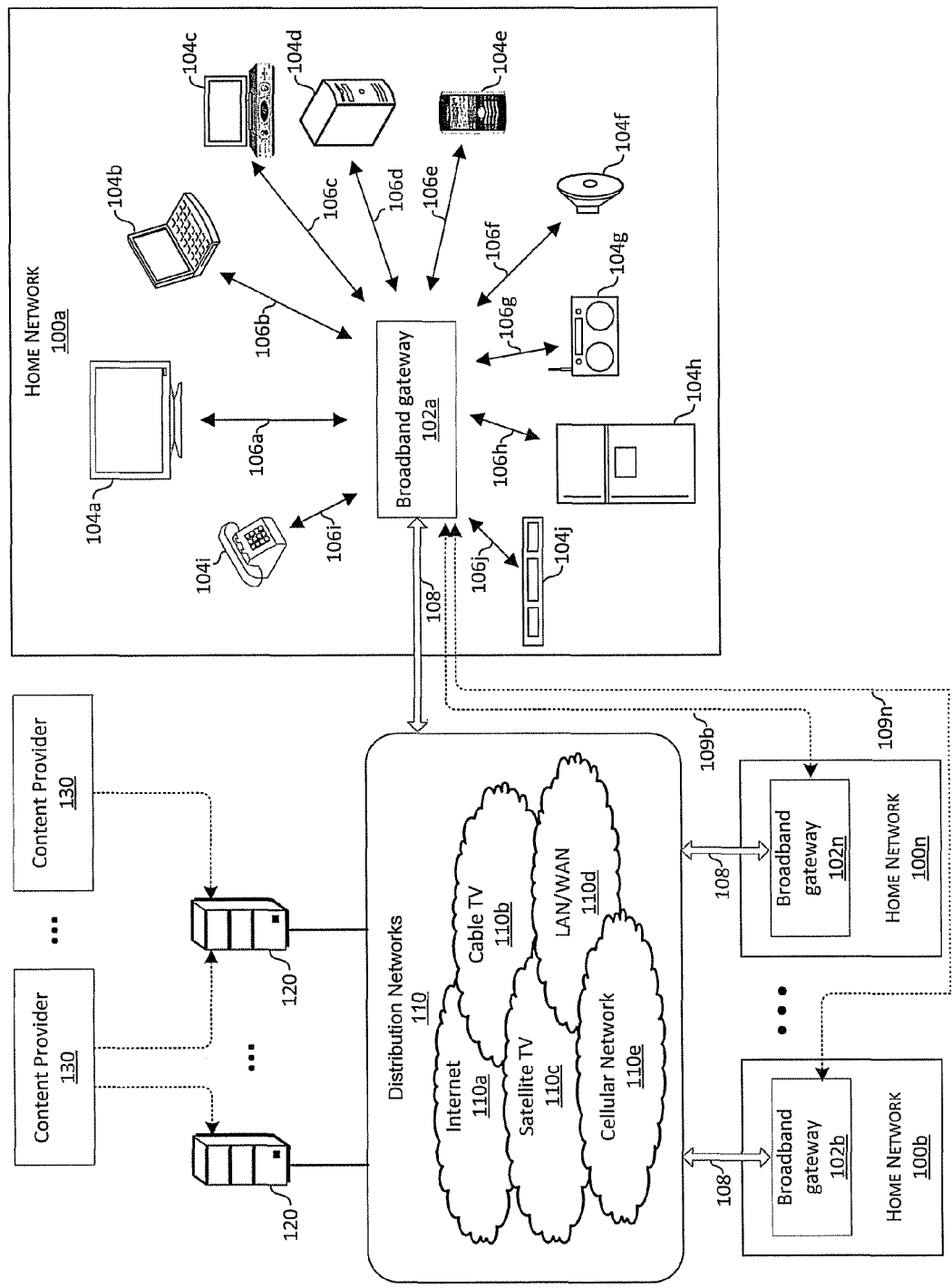
FIG. 1 is a block diagram illustrating an exemplary communication system that comprises a home network serviced by a broadband gateway, in accordance with an embodiment of the invention.

FIG. 1 is a block diagram illustrating an exemplary communication system that comprises a home network serviced by a broadband gateway, in accordance with an embodiment of the invention. Referring to FIG. 1, there is shown a home network 100a, a plurality of distribution networks 110, a plurality of service providers 120, and a plurality of content providers 130. The home network 100a may be serviced by a broadband gateway 102a. Also shown in FIG. 1 are additional home networks 100b, . . . , 100n. Each of the home networks 100b, . . . , 100n may also be serviced by a broadband gateway 102b, . . . , a broadband gateway 102n.

The service providers 120 may comprise various entities which may provide various services using different access technologies to devices 104 via the gateway 102 and/or to the gateway 102 itself. The services may include, but are not limited to, multimedia, television, Internet, phone, Ethernet, multimedia over coax alliance (MoCA), passive optical network (PON), and/or cellular services, for example. Some of the service providers 120 may comprise network access service providers which provide physical layer connections to the gateway 102a. Such physical layer connections may then be utilized to access, and/or may be part of, the distribution networks 110. In this regard, "network access service provider" as utilized herein, is distinguished from the more generic term "service provider" which may encompass services other than providing physical layer access to a network. Cable television providers, plain old telephone service (POTS) providers, digital subscriber line (DSL) providers, cellular providers, WiMAX providers, and satellite providers are examples of network access service providers.

The content providers 130 may generate, capture, and/or package content, such as multimedia content, that may be distributed to end-users. The content may comprise, for example, audio, video, e-book, gaming, and/or other content. The content may be, for example, downloadable and/or streaming, rented and/or purchased. In some instances, a content provider and a service provider may be separate. In some instances, as indicated by the dashed line 106, a single provider may provide both content and services. For example, an entity that functions as a network access service provider may also provide content and/or services other than network access and, thus, that entity may also be accurately referred to as a "content provider" and/or a "service provider." Content and/or services that are provided by a content provider 130 and/or a service provider 120 may be provided to the gateway 110 via a physical layer connection provided by a network access service provider 120.

The plurality of distribution networks 110 may comprise one or more networks that may be operable to enable wireless and/or wired communication among a plurality of entities based on one or more networking and/or communication infrastructures. In this regard, the plurality of distribution networks 110 may be utilized to enable distributing multimedia content generated by the content providers 130, directly and/or via the service providers 120, to end-users. The network connectivity available via the plurality of distribution networks 110 may be based on one or more communication standards and/or protocols. The plurality of distribution networks 110 may comprise, for example, the Internet 110a, a CATV network 110b, a satellite television (TV) network 110c, a wireless local area network/wide area network (LAN/WAN) 110d, and/or a cellular network 110e.

The Internet 110a may comprise a system of interconnected networks to enable exchange of data between a plurality of nodes, based on one or more networking standards, including, for example, the Internet Protocol (IP). For example, the Internet 110a may enable connectivity among a plurality of private and public, academic, business, and/or government nodes and/or networks. The physical connectivity may be provided in the Internet 110a via, for example, the Public Switched Telephone Network (PSTN), copper wires, fiber-optic cables, wireless interfaces, and/or other protocols and/or standards-based interfaces. The transport functionality may be performed in the Internet 110a based on, for example, one or more protocols, such as the Transmission Control Protocol/IP (TCP/IP), for example. The CATV network 110b may comprise suitable distribution nodes, systems, and/or subnetworks that may enable forwarding of communication between CATV providers and a plurality of cable-TV consumers. For example, the CATV network 110b may comprise a network of fiber optics and/or coaxial cables for use in CATV broadcasts. The satellite TV network 110c may comprise suitable distribution nodes, systems, and/or subnetworks that may enable communication of satellite TV broadcast by satellite TV providers to a plurality of consumers. For example, the satellite network 110c may comprise a plurality of orbiting satellite nodes and/or one or more terrestrial centers in a satellite-TV system.

The LAN/WAN network 110d may comprise suitable logic, circuitry, interfaces, and/or code that may be operable to enable implementation of one or more wired and/or wireless LAN or WAN standards and/or protocols. Exemplary WAN technologies comprise, for example, WiMAX-based networks. Exemplary LAN technologies may comprise, for example, those based on IEEE 802.11 standards, including, for example, WiFi-based networks. The cellular network 110e may comprise suitable logic, circuitry, interfaces and/or code that may be operable to enable communication via one or more cellular technologies. Exemplary cellular technologies may comprise Code Division Multiple Access (CDMA), wideband CDMA (WCDMA), CDMA1000, High-Speed Downlink Packet Access (HSDPA), Global System for Mobile Communications (GSM), General Packet Radio Services (GPRS), Enhanced Data Rates for Global Evolution (EDGE), and/or Universal Mobile Telecommunication System (UMTS). The cellular network 110e may comprise, for example, a plurality of control and/or switching nodes, and a plurality of base stations that enable transmission and/or reception of cellular based communications between the cellular network 110e and cellular capable devices.

The home network 100a may correspond to a location that may comprise a plurality of devices 104 which may be serviced and/or managed by the broadband gateway 102a. In this regard, the location may be a residence (e.g., home, apartment), a small business, a school, a library, and/or other like settings in which users may want to obtain access to service and/or to content provider networks. The broadband gateway 102a may be utilized in the home network 100a to provide connectivity between the home network 100a and the service providers 120 (and/or the content providers 130) via the distribution networks 110.

A broadband gateway such as the broadband gateway 102a may comprise suitable logic, circuitry, interfaces, and/or code that may be operable to provide connectivity between one or more devices in a home network, such as the home network 100a, and a plurality of external networks. For example, the broadband gateway 102a may handle a plurality of broadband physical layer connections 108 to the distribution networks 110. The broadband physical layer connections 108 may comprise wired, optical, and/or wireless connections between the broadband gateway 102 and the distribution networks 110, which may enable communication between the broadband gateway 102a and the service providers 120. The broadband gateway 102a may operate as an interface device that may allow one or more service and/or content providers to interact with various devices in the home network. In this regard, the broadband gateway 102a may be operable to perform and/or provide various services that may pertain to enabling and/or facilitating reception of content from one or more content providers, wherein the content may be delivered through one or more services providers. For example, the broadband gateway 102a may be operable to perform such operations as network access related processing (e.g., PHY/MAC, transport layer processing), encryption and/or decryption, user and/or account authentication, and/or at least some of video and/or audio processing operations that may be needed for consumption of multimedia content. The broadband gateway 102a may communicate with various devices in the home network 100, using wired and/or wireless communication links.

A single broadband gateway such as the broadband gateway 102a may be operable to handle multiple physical layer (i.e., layer 1 of the open-systems interconnection model (OSI)) connections 108 to multiple ones, or portions; of the distribution networks 110, where different ones or portions of the distribution network(s) 110 are owned, operated, leased, or otherwise associated with different network access service providers 120. For example, a first network access service provider 120 may provide network access to the broadband gateway 102a via a DSL connection over twisted-pair cabling, and a second network access service provider 120 may provide network access to the broadband gateway 102a via a cable television connection over coaxial cabling. In some instances, the broadband gateway 102a may be operable to concurrently communicate over multiple physical layer connections provided by multiple network access service providers.

The broadband gateway 102a may also be operable to provide and/or support various other, non-content related services in the home network 100a. For example, the broadband gateway 102a may be operable to provide energy management in the home network 100a, by controlling and/or adjusting configuration of one or more devices in the home network to reduce power consumption for example.

Devices serviced by, and/or connected with the broadband gateway 100a may comprise content consuming devices and/or other, non-content consuming household or home devices that may be operable to interact with the broadband gateway 102a. For example, the broadband gateway 102a may service, and/or may communicate with a plurality of home devices 104a-104j in the home network 100a. The home devices may comprise, for example, one or more of a television 104a, a laptop computer 104b, a smoke detector, a carbon monoxide detector, and/or a security alarm 104c, a computer and/or server 104d, a mobile phone 104e, a speaker 104f, an AM/FM radio 104g, a phone 104h, an appliance 104i (e.g., refrigerator), and a digital video recorder (DVR) or personal video recorder (PVR) 104j. The broadband gateway 102a may interact with each of the home devices 104a-104j via links 106a-106j, which may be supported by the broadband gateway 102a and the corresponding home device. For example, the link 106a between the broadband gateway 102a and the television 104a may comprise a High-Definition Multimedia Interface (HDMI) cable and/or 60 GHz WiGig wireless connection/interface. The link 106b may comprise, for example, a wired Ethernet link, a wireless Ethernet link, a Universal Serial Bus (USB) link, or an IEEE 1394 link. The link 106c may comprise, for example, a two-wire link or a wireless link. The link 106d may comprise, for example, a wired Ethernet link, a wireless Ethernet link, a USB link, or an IEEE 1394 link. The link 106e may comprise, for example, a wireless Ethernet link, a USB link, or a cellular link. The link 106f may comprise speaker wire and/or a wireless link. The link 106g may comprise, for example, AM and/or FM radio transmissions broadcast received using the broadband gateway 102a. The link 106h may comprise, for example, a phone line. The link 106i may comprise, for example, a wired or wireless Ethernet link. The link 106j may comprise, for example, a wired or a wireless link.

The broadband gateway 102a may provide a set of gateway functionalities enabling users or devices to access content for services found in one or more service domains ported or opened on the broadband gateway 102a. The gateway functionalities may comprise service domain types, service provider preferences, security features, remote access, content or message processing capabilities such as, for example, queue management, message routing, filtering and/or editing, software platforms, protocols, applications and/or interfaces. Depending on gateway capabilities, various gateway functionalities may be integrated into the broadband gateway 102a to secure content distribution and/or enhance user service experiences. For example, remote access gateway functionality may allow a roaming user or device to remotely access content for services provided by service providers and/or networks via its own home gateway. A home gateway for a device is a gateway where the device was assigned by networks at sign-up and where the subscriber information associated with the device is stored.

The service providers 120 and/or the plurality of distribution networks 110 may provide communication services in different coverage areas, which are referred to as service domains. Service domains or service coverage areas may be associated with corresponding service domain types. Service domain types may indicate information about communication and/or networking technologies adopted in corresponding service domains. For example, service domain types may comprise access network types such as GSM, UMTS, Wireless LAN and/or Bluetooth. Each service domain or service coverage area may implement its own security features such as, for example, authentication mechanisms, security policies and/or message integration check. In some instances, the service providers 120 and/or the distribution networks 110 may apply conditional access and/or content rights management to service reception within a specific service coverage area based on authentication and/or authorization. For example, the service providers may utilize data encryption standard (DES) encryption-based conditional access (CA) to securely deliver content to users or devices within the specific service coverage area. The specific service coverage area or service domain may be referred to as an authorized service coverage area (ASCA) or an authorized service domain (ASD). In this regard, the service reception within an ASCA or ASD may be fully controlled and protected by the service providers 120 and/or the distribution networks 110. An ASD or ASCA may comprise a set of services and associated system features with some pre-specified verifiable rules, for example, restricted services such as carrier grade video service and VoIP with QoS, allowed content types such as H.264 video, MPEG-2 video and AAC audio, and protection mechanism/profiles for device, network, and/or content, which may comprise Content encryption, I/O and memory protection, device authentication and/or network authentication.

In the exemplary embodiment of the invention illustrated in FIG. 1, although the devices 104a-104j may communicate only the broadband gateway 102 as shown, the invention may not be so limited. Accordingly, the devices 104a-104j may communicate with multiple broadband gateways in a local or home network without departing from the spirit and scope of various embodiments of the invention.

As illustrated in FIG. 1, a plurality of home networks 100b, . . . , 100n, may also be connected to the distribution networks 110. These home networks 100b, . . . , 100n may operate in substantially the same manner as the home network 100a. By having multiple home networks connected to the distribution networks 110, various applications, such as peer-to-peer communication and/or data aggregation operations may be possible by utilizing the broadband gateways 102a, . . . , 102n in the home networks.

In operation, in instances where a device such as the device 104e is near its home gateway such as the broadband gateway 102a in the home network 110a, the device 104e may request that content for a service found in a dedicated ASCA or ASD for the broadband gateway 102a, be delivered to it via the broadband gateway 102a. A dedicated ASD or ASCA for a gateway is referred to an ASD or ASCA specifically associated with the gateway. In this regard, the broadband gateway 102a may be operable to acquire content from the service providers or networks for the requested service in its dedicated ASD or ASCA.

In an embodiment of the invention, in instances where the device 104e roams away from its home gateway such as the broadband gateway 102a to one or more visited gateways such as the broadband gateway 102b, the device 104e may still need to access content for the requested service in the dedicated ASD or ASCA for the home gateway. In this regard, one or more gateway functionalities such as software structure interfaces and signaling protocols required to execute the requested service in the dedicated ASD or ASCA on the home gateway may be ported, forwarded, and/or otherwise communicated to the broadband gateway 102b. The broadband gateway 102b may utilize the ported gateway functionalities to process content or messages for the requested service in the dedicated ASD for the home gateway.

In an embodiment of the invention, in order to securely distribute or communicate content for the requested service in the dedicated ASD for the home gateway, a common ASD may be negotiated between the home gateway and a visited gateway. The dedicated ASD for the home gateway and the dedicated ASD for the visited gateway may be compared during the negotiation communication so as to determine the common ASD or ASCA. The common ASD may be determined by matching up the dedicated ASD or ASCA for the home gateway. The determined common ASD may be ported to the home gateway as well as on the visited gateway to secure transmitted and/or received content. Services found in the determined common ASD or ASCA may not be identical, but similar to services found in the dedicated ASD or ASCA for the home gateway. For example, in instances where the determined common ASD may implement lower security levels and/or less security policy constrains, content authorized for services in the determined common ASD may not be authorized for services in the dedicated ASD for the home gateway. In other words, content for services in the dedicated ASD for the home gateway may be accepted by the determined common ASD, but not vice versa.

In an embodiment of the invention, a link between the home gateway and the visited gateway may be established or set up to selectively communicate content acquired for services in the negotiated common ASD. In this regard, the acquired content may be securely distributed over the established link between the home gateway and the roaming gateway. A link between gateways, for example, links 109b, . . . 109n, may comprise wired, optical, and/or wireless connections between the broadband gateway 102a and the broadband gateways 102b, . . . , 102n, which may enable communication between the broadband gateway 102a and the broadband gateways 102b, . . . , 102n.

In an embodiment of the invention, the home gateway and/or the visited gateway may be operable to acquire content for services from corresponding networks when needed. In this regard, the home gateway and/or the visited gateway may acquire services from corresponding networks based on the negotiated common ASD. Content for the acquired services may be communicated over the established link to secure content distribution.

In an embodiment of the invention, a gateway such as the home gateway may establish links with one or more visited gateways by matching up its own dedicated ASD. In some instances, the home gateway needs to access content for a specific service found in the dedicated ASD for the home gateway. Instead of acquiring the specific service from networks, the home gateway may check with the one or more linked visited gateways. In instances where content or similar content for the specific service is available at the one or more linked gateways, the home gateway may acquire content of interest from the one or more visited gateways over the corresponding established links. The home gateway may then compact or assemble the acquired content to support the intended service without going through the corresponding networks.

Figure 2:
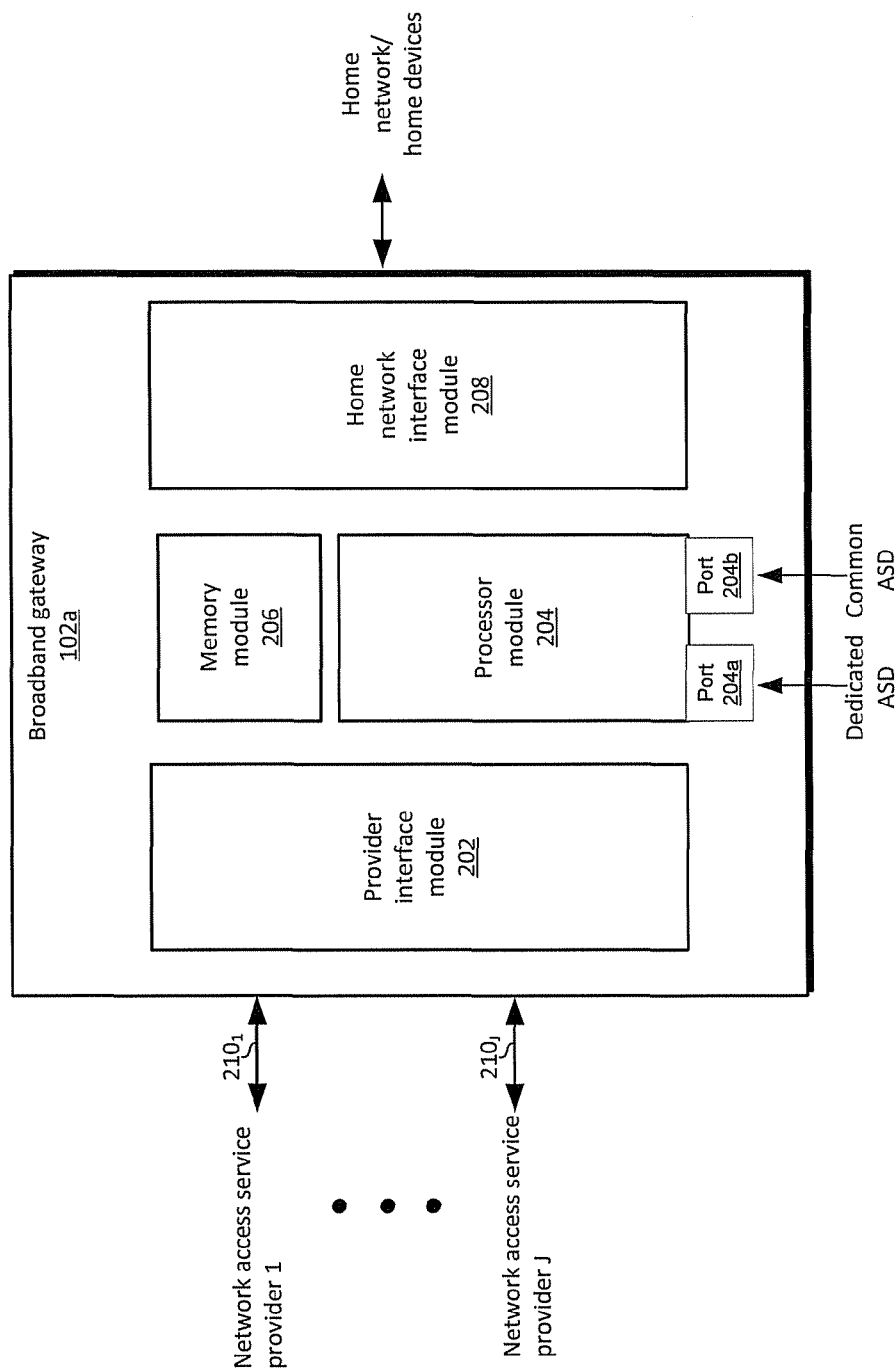
FIG. 2 is a diagram illustrating an exemplary broadband gateway, which may be operable to port gateway functionality associated with a user from a first gateway to one or more other gateways in a home network, in accordance with an embodiment of the invention.

FIG. 2 is a diagram illustrating an exemplary broadband gateway, which may be operable to port gateway functionality associated with a user from a first gateway to one or more other gateways in a home network, in accordance with an embodiment of the invention. Referring to FIG. 2, the broadband gateway 102 may comprise suitable logic, circuitry, code, and/or interfaces that may be operable to provide connectivity between one or more networks, such as the distribution networks 110 shown in FIG. 1, for example, and one or more devices in a home network, such as the home devices 104a-104j in the home network 100a shown in FIG. 1.

A gateway such as the broadband gateway 102a may operate as an interface device that allows one or more devices in the home network to access one or more networks, and to access various services and/or content via those one or more networks. For example, the broadband gateway 102a may be utilized to enable interaction between the plurality of service providers 120 and/or the plurality of content providers 130, and the home devices 104a-104j. In some instances, the broadband gateway 102a may also communicate or interact with other gateways such as the broadband gateways 102b-102n to support seamless service deployment on one or more roaming devices. In instances where a home device such as the device 104e in the home network 110a roams away from its home gateway (the broadband gateway 102a) to one or more visited gateways such as the broadband gateway 102b, the device 104e may need to access content for a specific service found in a dedicated ASD for the home gateway. In instances where certain gateway functionalities utilized on the home gateway for the specific service are not currently supported or available on the visited gateway, the home gateway may be operable to forward information about the required gateway functionalities to the visited gateway. In this regard, the visited gateway may be configured to support the required gateway functionalities for the specific service. Depending on gateway capabilities, the visited gateway may port or add the required gateway functionalities, which may be pushed, forwarded, and/or otherwise communicated from the home gateway, for the specific service. The visited gateway may also perform gateway functionality conversion to support the specific service on the visited gateway. In an exemplary embodiment of the invention, the home gateway may support a Session Initiation Protocol (SIP) signaling, and a Signaling System 7 (SS7) signaling may be utilized by the visited gateway for service deployment. The home gateway may signal the visited gateway for the information about the SIP gateway functionality required for the specific service. The visited gateway may port or add the SIP gateway functionality or may perform SIP-SS7 conversion, depending on gateway capabilities, to support the specific service for the device 104e. To secure content transmission and reception for the specific service, the home gateway may negotiate a common ASD with the visited gateway by matching up its own dedicated ASD. The negotiated common ASD may be ported to the home gateway as well as to the visited gateway. A link may be established or set up based on the negotiated common ASD to selectively communicate content for the specific service between the home gateway and the visited gateway. The device 104e may receive content via the visited gateway for the specific service found in the dedicated ASD for the home gateway. With the established link and ported common ASD, either the home gateway or the visited gateway may acquire content for the services in the negotiated common ASD from the corresponding networks or service providers. The acquired content may be communicated over the established link between the home gateway and the visited gateway. In this regard, the acquired content may be shared based on corresponding location information for the home gateway and the visited gateway. For example, the visited gateway may acquire content for a soccer game in the area where the home gateway is placed. The visited gateway may then forward the acquired content to the home, gateway over the established link. In some instances, the home gateway may establish links with one or more other gateways by matching up its own dedicated ASD. The home gateway may collect content of interest from each of the one or more other gateways over the corresponding established links. The home gateway may compact the collected content to support a service of interest without actually acquiring the service from the corresponding networks.

The broadband gateway 102a may communicate with the various devices via a home network that may comprise wired and/or wireless communication links, such as the home network 100a. In this regard, the broadband gateway 102a may comprise suitable hardware and/or software to provide some or all of the functions and/or operations of one or more of a modem, a router, and a switch. The modem functions and/or operations may be those of a digital subscribed line (DSL) modem, a cable modem, or a wireless cable modem, for example. The router functions and/or operations may be those of a wireless router, for example. The switch functions and/or operations may be those of a network switch, or a local area network (LAN) switch, for example. In some instances, the broadband gateway 102a may communicate with the various devices in the home via more than one home network.

The broadband gateway 102a may be operable to provide energy management by varying the configuration of one or more devices in the home network. The broadband gateway 102a may collect and/or store energy-related information of the devices in the home network and/or of the links in the home network, and may utilize such information to control the operation of the home devices. For example, the broadband gateway 102a may utilize channel capacity flexibility and content coding options to minimize and/or optimize power utilization. The broadband gateway 102a may also configure and/or manage the configuration of the network between the broadband gateway 102a and one or more service/content providers based on the energy-related information associated with the devices in the home. For example, at least a portion of the distribution networks 100 may be configured and/or managed in this manner. The broadband gateway 102a may be utilized to display energy-related metrics, including consumption trends and/or costs, for example, and to display any available credits/rewards that may be redeemed by a user. In some instances, when a device in the home network is a certified device, such as a California efficient display, for example, the broadband gateway 102a may be utilized to provide that information to a service/content provider and obtain rewards/credits associated with the use of such certified devices. Moreover, overall network power consumption may be managed by sharing information among multiple interconnected broadband gateways.

The broadband gateway 102a may be operable to adapt and/or enable changes in a subscription model and/or in multimedia delivery characteristics based on the capabilities of the various devices in the home network. For example, high-definition video content may be delivered to certain type of devices, such as digital televisions (DTVs), while low-definition video content and/or text may be delivered to a different type of devices, such as personal mobile devices. In this regard, the broadband gateway 102a may be utilized to reduce bandwidth and/or processing power consumption in the home network. The broadband gateway 200 may also support and/or use multi-transport processing, which may be performed sequentially, in parallel, and/or utilizing distributed processing.

The broadband gateway 102a may be operable to broker and/or arbitrate with service/content providers the consumption of certain services, such as music and video, for example. In some instances, the broadband gateway 102a may perform content search, transport discovery, ranking, and/or sorting. These operations may be performed based on content quality, price, quality-of-service (QOS), and network protocols supported by the devices in the home network, such as service level agreements (SLAs), for example.

Various emergency-related services in the home network may be supported by the broadband gateway 102a, including allowing first responders to provide alerts to a select group of users by accessing the broadband gateway 102a via secure links provided by the service/content providers. For example, the broadband gateway 102a may enable an emergency service provider, such as those associated with the emergency service provider network 140 described above in FIG. 1, to access one or more devices in the home network.

Customized graphical user interfaces (GUIs) may be generated by the broadband gateway 102a, wherein the GUIs may be used to visually display and/or provide interaction with the customized content.

For peer-to-peer communication, the broadband gateway 102a may be utilized to allow enhanced content sharing in a service/content provider network. In this regard, the broadband gateway 102a may be utilized to construct a directory service for peer-to-peer connectivity with friends and family, for example. The broadband gateway 102a may be utilized to provide incentives to users who engage in peer-to-peer communication through, for example, the distribution networks 110. Moreover, the broadband gateway 102a may be utilized to match the content coding to the service type being consumed by the user and to make the necessary allocations through the network with respect to peer-to-peer or conventional Internet programming or broadcast programming.

The broadband gateway 102a may be utilized in connection with constrained network resources, such as time of day, traffic congestion, and the like, for example, to provide incentives for a user to accept a lower cost, lower quality of service that is dynamically configured for current network conditions. In some instances, the broadband gateway 102a may allow enhanced low latency service delivery to client devices in a home network.

The broadband gateway 102a may be operable to run or execute an agent to extract content, rating, copyright, language, privacy rules, and automatically add user generated content, for example. Such agent may be run or executed in connection with the processor module 204 of the broadband gateway 102a, for example. In some instances, the broadband gateway 102a may be operable to provide rating-related information or channel prediction to a service/content provider to assist with fast channel change.

Bandwidth optimization by, for example, placing future requests for bandwidth to a service/content provider and accepting the best timeslots provided in return may be enabled by the broadband gateway 102a.

The broadband gateway 102a may be operable to combine and/or blend multiple contents for use as single content in the home network. Such combination may be performed in one or more of the modules of the broadband gateway 102a. For example, the broadband gateway 102a may blend different video and audio contents for an event by accessing one or more service/content providers and providing automatic and/or manual content synchronization.

The protection, management, and/or tracking of confidential data, such as health and financial records, for example, by tagging the data may be provided by the broadband gateway 102a. Only when a user authorizes the transfer of the confidential data will such data be stored and/or aggregated. The broadband gateway 102a may be operable to create a trusted rating mechanism for content. The broadband gateway 102a may be secure against external threats that may be downloaded from outside the home network and may provide a secure domain distribution in the home network. Automated and secured billing and payment services may also be provided by the broadband gateway 102a.

The broadband gateway 102a may be operable to utilize, client or home device profile information to select layered video service(s) and/or transmission. Such information may be stored, at least temporarily, in the memory module 206 of the broadband gateway 102a. In some instances, the programming and/or enhanced video layers received by the broadband gateway 102a may be aggregated midstream by one or more network or routing nodes.

The broadband gateway 102a may support a reduction in the cost of unwatched content by using multi-tier billing for downloaded content, such as video content. The broadband gateway 102a may be utilized to provide a unified payment portal for collecting and/or aggregating charges from multiple service and/or content providers.

The broadband gateway 102a may comprise one or more modules. Each of these modules may comprise hardware, software, or a combination thereof that may be utilized to perform various operations associated with the broadband gateway 102a. In an embodiment of the invention, the broadband gateway 102a may comprise a provider interface module 202, a processor module 204, a memory module 206, and a home network interface module 208. In some instances, the broadband gateway 102a may be such that the various modules listed above may be distributed over multiple devices. Moreover, the modules listed above are provided by way of illustration and not of limitation. Other configurations and/or architectures of the broadband gateway 102a may also be implemented. For example, the broadband gateway 102a may be a virtual gateway that is setup in a network by utilizing virtual machines (VMs) and/or next-generation (NG) data centers.

The provider interface module 202 may comprise suitable logic, circuitry, code, and/or interfaces that may be operable to receive data from and/or send data to one or more service/content providers via one or more physical layer connections 130 to one or more network access service providers. In this regard, each of the physical layer connections $130_1$-$130_j$ may connect the gateway 110 to a difference network access service provider. Each of the physical layer connections 130 may comprise a wired, optical, or wireless connection. Each of the physical layer connections 130 may utilize different physical media and/or different physical layer protocols. For example, the connection $130_1$ may comprise a DSL over twisted-pair connection and the connection $130_j$ may comprise a CATV over coaxial cable connection.

The processor module 204 may comprise suitable logic, circuitry, code, and/or interfaces that may be operable to process data received from the service/content providers and/or data received from one or more devices 104 in the home. Data received from the service/content providers via one or more physical layer connections $210_1$-$210_j$ may be processed to make it suitable for communication to a device such as the device 104a and data from the one or more devices 104 may be processed to make it suitable for communication to the service/content providers via one or more physical layer connections $210_1$-$210_j$. In this regard, the processor module 204 may comprise one or more portions that are suitable to handle communication or interactions between the plurality of service providers 120 and/or the plurality of content providers 130, the devices 104, and other gateways. For example, the processor module 204 may communicate, via the provider interface module 202, with associated networks and/or service providers such as the plurality of service providers 120 for a specific service found in its own dedicated ASD. The processor module 204 may communicate with associated networks via the provider interface module 202 to acquire content for the specific service. The processor module 204 may communicate the acquired content with, for example, the device 104e, via the home network interface module 208. In some instances, the device 104e may roam away from its home gateway such as the broadband gateway 102a to a visited gateway such as the broadband gateway 102b. To continue the specific service on the device 104e, the processor module 204 may signal the broadband gateway 102b, via the provider interface module 202, to provide information about gateway functionalities such as, for example, security features, preferences, multiple user interface software structures, applications, electronic programming guides (EPGs), and user profile, required to support the specific service. Depending on gateway capabilities, the visited gateway (the broadband gateway 102b) may port the gateway functionalities required or perform gateway functionality conversion so as to support the specific service. In addition, to secure content transmission and reception for the specific service, the processor module 204 may communicate with the visited gateway (the broadband gateway 102b), via the provider interface module 202, to negotiate a common ASD for the specific service. For example, the processor module 204 may classify the access level for different users and/or allow limited access to content for the specific service during the negotiation communication. The processor module 204 may determine the common ASD by matching up its own ASD ported to the broadband gateway 102a via a port 204a. The determined common ASD may be ported to the broadband gateway 102a via a port 204b. A port such as the port 204a and the port 204b may be end points to a physical or logical connection. The processor module 204 may communicate with the broadband gateway 102b, via the provider interface module 202, to establish or set up a link or connection to the broadband gateway 102b. The processor module 204 may selectively communicate content for the specific service over the established link to the broadband gateway 102b when needed. In some instances, the processor module 204 may establish one or more links with other gateways by matching its own dedicated ASD. The processor module 204 may collect content of interest from other gateways, via the provider interface module 202. The processor module 204 may assemble the collected content and communicate the assembled content to, for example, the device 104e, via the home network interface module 208. The assembled content may be utilized by the device 104e to support a specific service without actually or directly acquiring the specific service from a service provider and/or corresponding networks, via the broadband gateway 102a.

The processor module 204 may also be operable to generate a graphical user interface (GUI) which may be manipulated via which a user may provide input. The GUI may be displayed as part of an OSD on a local device 104, such as a monitor or television, and may be manipulated via a remote control and/or other input device that communicates directly with the broadband gateway 102a. The GUI may be a web-based interface, and a user may interact with it via a computer and web browser. The GUI may be customized based on characteristics of the broadband gateway 102a, the device 104 coupled to the broadband gateway 102a, and the service and/or content providers associated with the broadband gateway 102a. The processors module 204 may utilize the memory 206 in performing its functions.

The memory module 206 may comprise suitable logic, circuitry, code, and/or interfaces that may be operable to store data utilized in the operations of the broadband gateway 102a. For example, the memory module 206 may be utilized to store configuration data, parameters, device information, tracking and/or monitoring information, security information, and intermediate processing data, for example. The memory module 206 may comprise storage media that may be integrated in the broadband gateway 102a and/or may be removable such as a removable storage device.

The home network interface module 208 may comprise suitable logic, circuitry, code, and/or interfaces that may be operable to receive data from and/or send data to one or more devices in the home network. The home network interface module 208 may be operable to support multiple communication protocols, standards, and/or data transport technologies. In this regard, the home network interface module 208 may handle one or more physical layer connections to one or more devices 104. For example, the home network interface module 208 may comprise, one or more wired and/or wireless Ethernet interfaces, one or more analog and/or digital audio outputs, one or more audio/video interfaces such as such as HDMI and DisplayPort, 60 GHz WiGig wireless connection/interface, one or more USB interfaces, one or more IEEE 1394, and/or one or more telephone jacks.

In operation, the broadband gateway 102a may provide a set of gateway functionalities such as, for example, security features, remote access, interface software structures and SIP signaling, to support services found in its own dedicated ASD. For example, the processor module 204 may communicate, via the provider interface module 202, with associated networks to acquire content for a specific service found in its dedicated ASD ported to the port 204a. The acquired content may be communicated to a requesting device such as the device 104e via the home network interface module 208. In instances where the device 104e roams away from the broadband gateway 102a to the broadband gateway 102b, for example, the processor module 204 may forward gateway functionality information required for the specific service to the broadband gateway 102b, via the provider interface module 202. In addition, the processor module 204 may set up a link with the broadband gateway 102b to provide the content for the specific service to the device 104e via the broadband gateway 102b. To secure content transmission and reception for the specific service, the processor module 204 may negotiate a common ASD with the broadband gateway 102b for the specific service. The common ASD may be determined by matching up the dedicated ASD ported to the port 204a. The determined ASD may be ported to the broadband gateway 102a as well as on the broadband gateway 102b. Content for the specific service may be selectively communicated over the established link when needed. In some instances, the processor module 204 may also collect content of interest from the broadband gateway 102b, via the provider interface module 202. The processor module 204 may assemble the collected content to support an intended service without going through corresponding networks.

Figure 3:
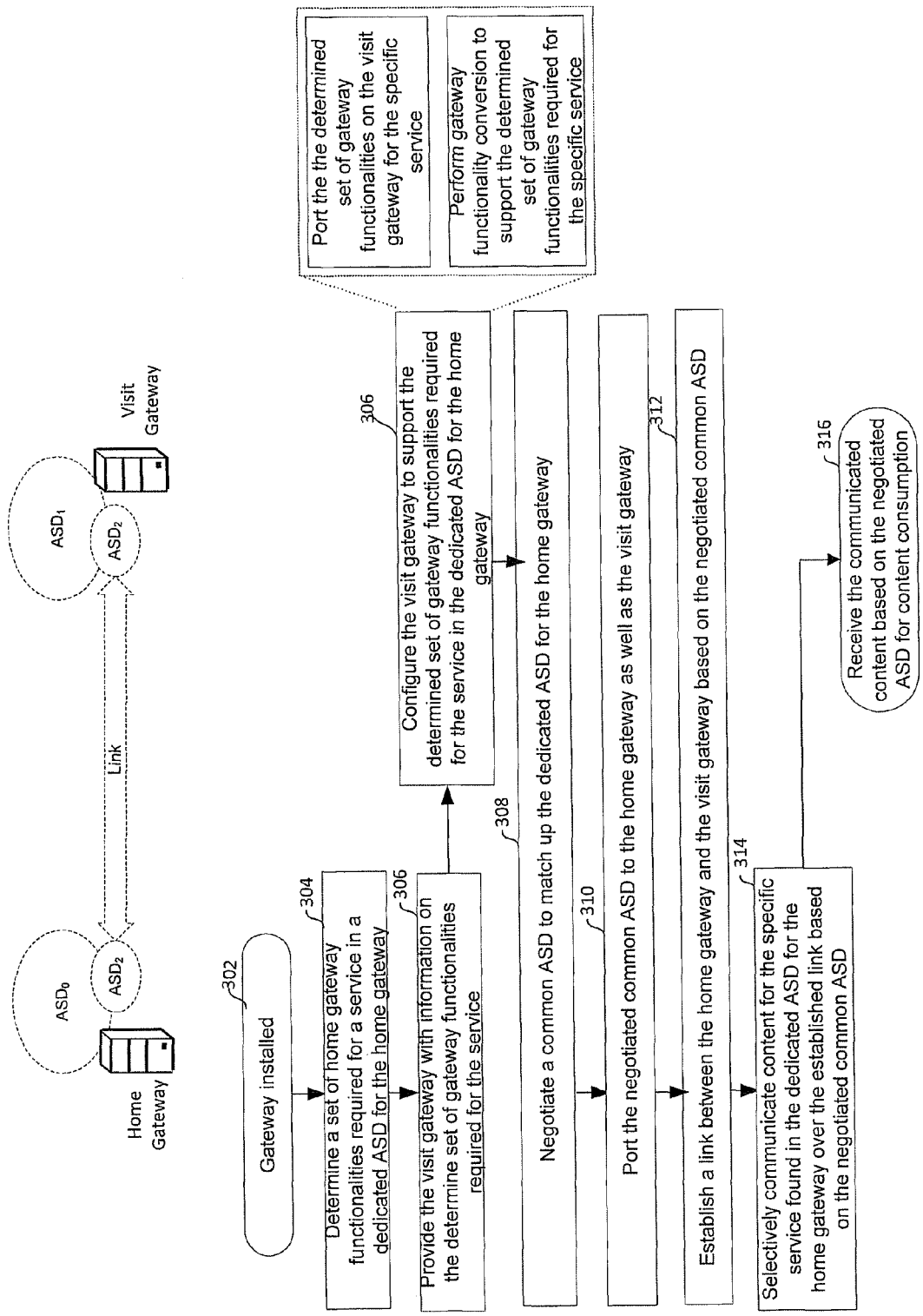
FIG. 3 is a flow chart illustrating exemplary steps that may be performed to establish a link between a home gateway and a roaming broadband gateway for content sharing, in accordance with an embodiment of the invention.

FIG. 3 is a flow chart illustrating exemplary steps that may be performed to establish a link between a home gateway and a roaming broadband gateway for content sharing, in accordance with an embodiment of the invention. Referring to FIG. 3, the exemplary steps may begin with step 302, in which a broadband gateway 102a may interface with other gateways for seamless service deployment. In step 304, a home device such as the device 104e may receive content for a specific service found in the dedicated ASD for its home gateway (the broadband gateway 102a). In some instances, the device 104e may roam away from the home gateway to a visited gateway such as the broadband gateway 102b. The home gateway may be requested continuously deliver content for the specific service to the device 104e. In this regard, the home gateway may determine a set of gateway functionalities required for the specific service. In step 306, the home gateway may provide the visited gateway with information about the determine set of gateway functionalities required for the service.

The home gateway may also push, forward and/or otherwise communicate a portion of the determined set of the gateway functionalities to the visited gateway whenever needed. In step 306, the visited gateway may be configured to support the determined set of gateway functionalities required for the service. Depending on gateway capabilities, the visited gateway may port the determined set of gateway functionalities or may perform gateway functionality conversion such as SIP-to-SS7 conversion to support the specific service. In step 308, the home gateway may negotiate a common ASD with the visited gateway by matching up the dedicated ASD for the home gateway. In step 310, the negotiated common ASD may be ported or added to the home gateway as well as to the visited gateway. In step 312, the home gateway may communicate with the visited gateway to establish a link for secure content distribution. In step 314, the home gateway may selectively communicate content for the specific service to the visited gateway over the established link based on the negotiated common ASD. In step 316, the visited gateway may receive the communicated content based on the negotiated ASD for content consumption.

Figure 4:
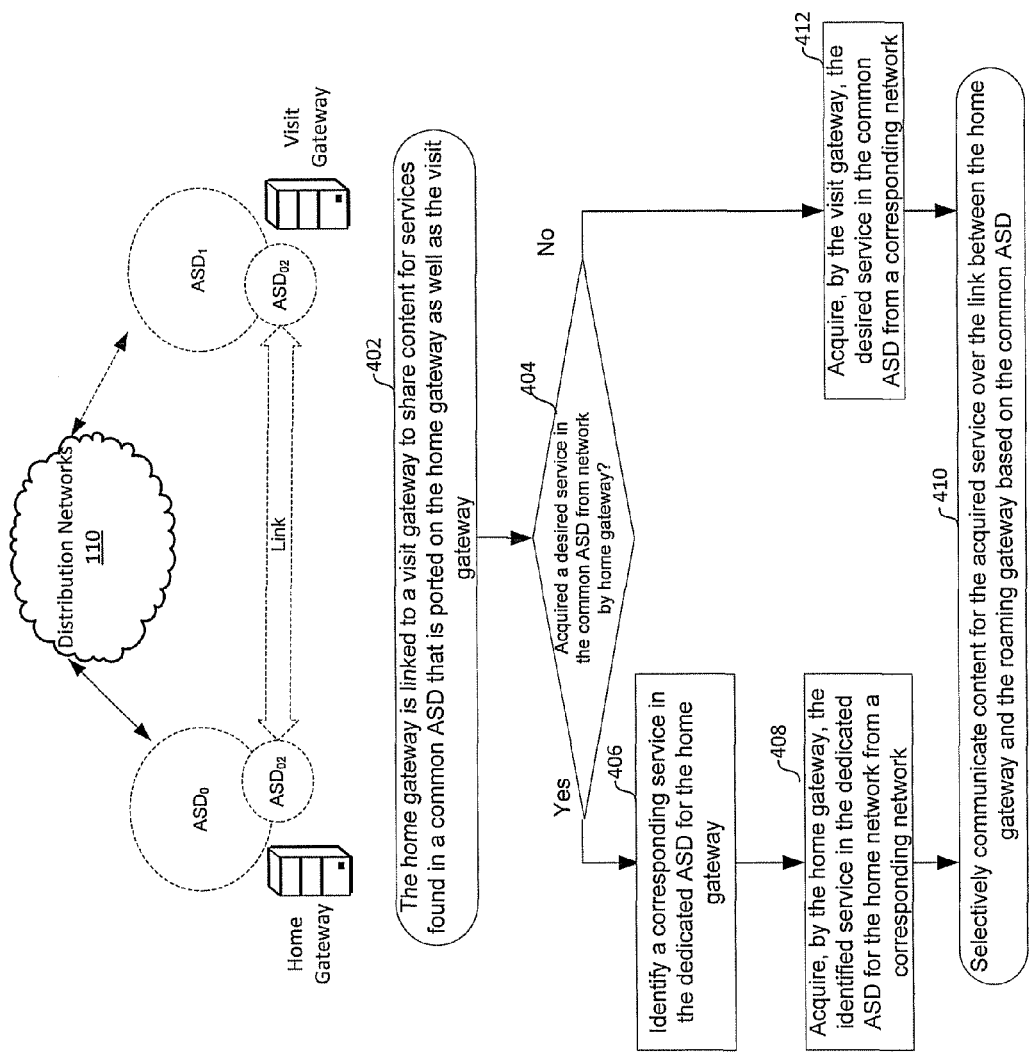
FIG. 4 is a flow chart illustrating exemplary steps that may be performed to acquire services in a common authorized service domain added to a home gateway and a roaming gateway in a home network, in accordance with an embodiment of the invention.

FIG. 4 is a flow chart illustrating exemplary steps that may be performed to acquire services in a common authorized service domain added to a home gateway and a roaming gateway in a home network, in accordance with an embodiment of the invention. Referring to FIG. 4, the exemplary steps may begin with step 402, in which a home gateway such as the broadband gateway 102a may interface with the devices 104, other gateways and the service/content providers via the distribution network(s) 110. The home gateway is linked to a visited gateway such as the broadband gateway 102b to share services found in a common ASD ported to the home gateway as well as to the visited gateway. In step 404, it may be determined whether a desired service may be acquired from corresponding networks by the home gateway or by the visited gateway. In instances where the desired service may be acquired by the home gateway from the network, then in step 406, the home gateway may identify a corresponding service in the dedicated ASD for the home gateway. In step 408, the home gateway may acquire the identified service in the dedicated ASD for the home gateway from a corresponding network. In step 410, content for the acquired service may be communicated over the link between the home gateway and the visited gateway based on the common ASD.

Figure 5:
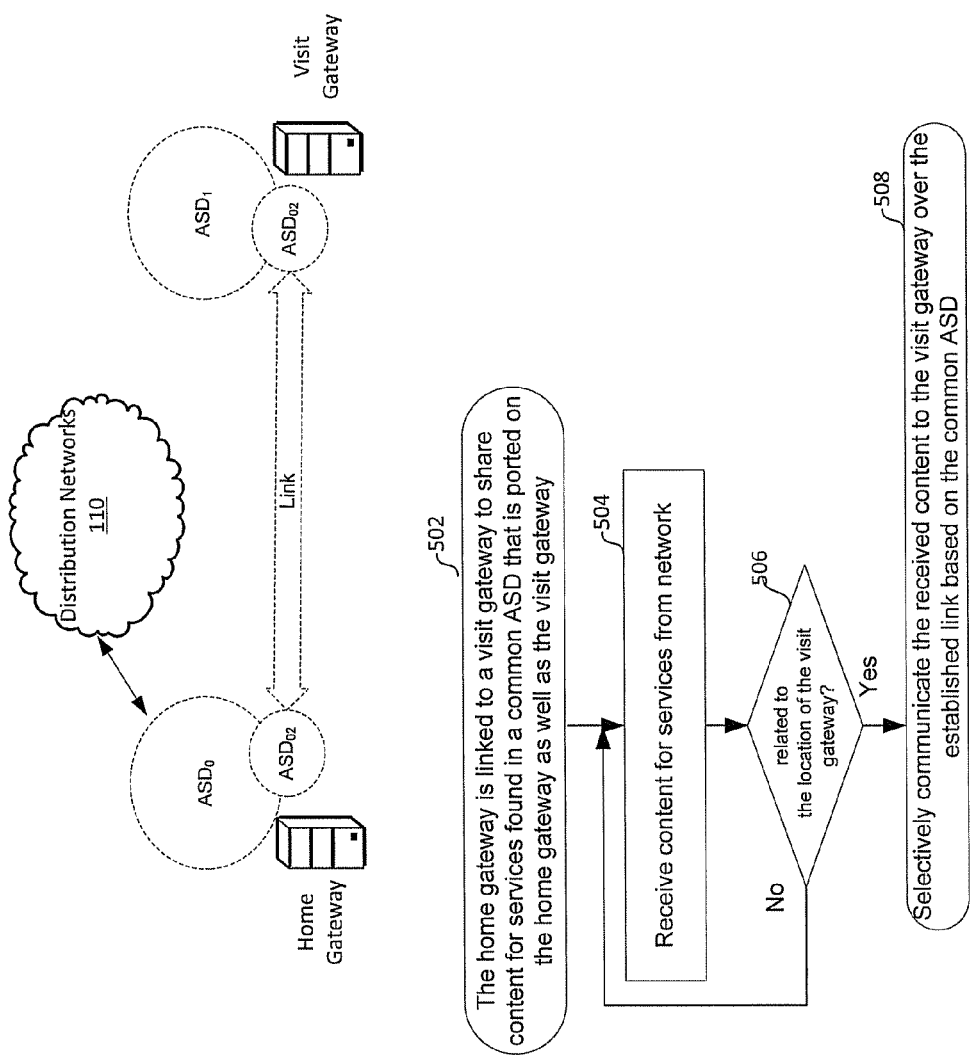
FIG. 5 is a flow chart illustrating exemplary steps that may be performed by a broadband gateway to share content for services found in an associated dedicated authorized service domain with a roaming gateway based on location information of the roaming gateway, in accordance with an embodiment of the invention.

FIG. 5 is a flow chart illustrating exemplary steps that may be performed by a broadband gateway to share content for services found in an associated dedicated authorized service domain with a roaming gateway based on location information of the roaming gateway, in accordance with an embodiment of the invention. Referring to FIG. 5, the exemplary steps may begin with step 502, in which a home gateway such as the broadband gateway 102a may interface with the devices 104, other gateways and the service/content providers via the distribution network(s) 110. The home gateway may be communicatively linked to a visited gateway such as the broadband gateway 102b to share services found in a common ASD ported to the home gateway as well as to the visited gateway. In step 504, the home gateway may receive content for services acquired from networks. In step 506, it may be determined whether the received content is related to location information of the visited gateway. In instances where the received content is related to the location information for the visited gateway, then in step 508, the home gateway may selectively communicate the received content over the established link to the visited gateway based on the common ASD.

In step 506, in instances where the received content is not related to the location information for the visited gateway, then the exemplary steps may return to step 504.

Figure 6:
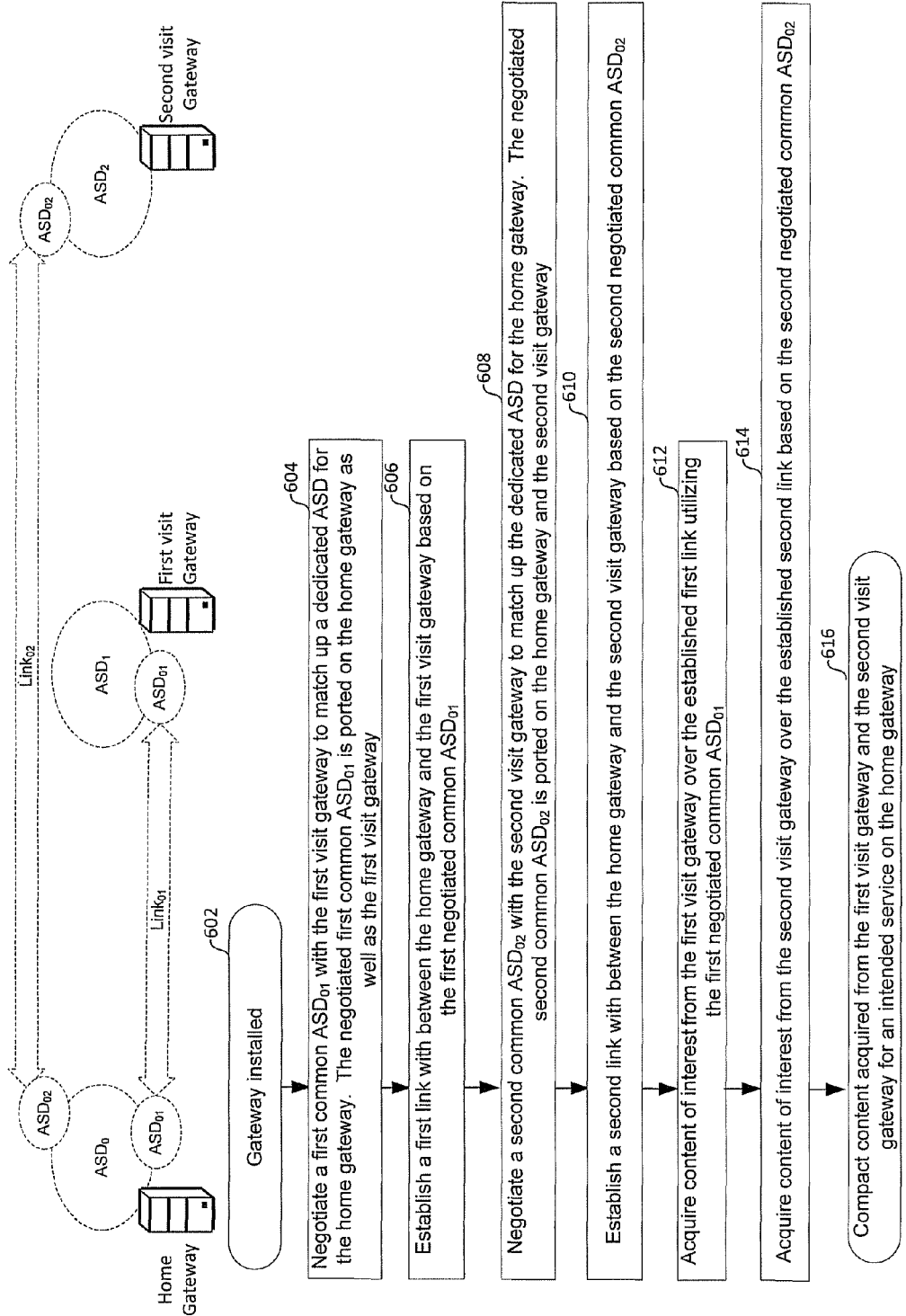
FIG. 6 is a flow chart illustrating exemplary steps that may be performed by a broadband gateway to compact content acquired from different roaming gateways for an intended service, in accordance with an embodiment of the invention.

FIG. 6 is a flow chart illustrating exemplary steps that may be performed by a broadband gateway to compact content acquired from different roaming gateways for an intended service, in accordance with an embodiment of the invention. Referring to FIG. 6, the exemplary steps may begin with step 602, in which a home gateway such as the broadband gateway 102a may interface with other visited gateways such as a first visited gateway and a second visited gateway for secure content distribution. In step 604, the home gateway may negotiate a first common ASD with the first visited gateway by matching the dedicated ASD for the home gateway. The negotiated first common ASD is then ported to the home gateway as well as to the first visited gateway. In step 606, the home gateway may communicate with the first visited gateway to establish a link for secure content distribution. In step 608, the home gateway may negotiate a second common ASD with the second visited gateway by matching up the dedicated ASD for the home gateway. The negotiated second common ASD is then ported to the home gateway as well as to the second visited gateway. In step 610, the home gateway may communicate with the second visited gateway to establish a link for secure content distribution. In step 612, the home gateway may acquire content of interest from the first visited gateway over the established first link utilizing the first negotiated common ASD. In step 614, the home gateway may acquire, content of interest from the second visited gateway over the established second link utilizing the second negotiated common ASD. In step 616, the home gateway may compact or assemble content, acquired from the first visited gateway and the second visited gateway to support an intended service on the home gateway without going through corresponding networks.

Various aspects of a method and system for porting gateway functionality associated with a user from a first gateway to one or more other gateways are provided. In various exemplary embodiments of the invention, a broadband gateway 102a, which enables communication with a plurality of devices 104, is operable to handle at least one physical layer connection to at least one corresponding network access service provider. The at least one physical layer connection may comprise a plurality of physical layer connections such as the physical layer connections $210_1$-$210_J$ and the at least one corresponding network access service provider may comprise a plurality of corresponding access service providers such as the service providers 120 and/or the content providers 130. Each of the plurality of physical layer connections $210_1$-$210_J$ corresponds to a respective one of the plurality of corresponding access service providers. The broadband gateway 102a may be operable to communicate or interact with other gateways such as the broadband gateways 102b-102n to support seamless service deployment for one or more roaming devices.

In various embodiment of the invention, a home gateway such as the broadband gateway 102a may be operable to negotiate with one or more other visited gateways such as the broadband gateways 102b-102n, a common authorized service area or domain (ASD) for providing one or more services from the broadband gateway 102a to the broadband gateways 102b-102n. The broadband gateway 102a may establish one or more corresponding communication links or connections to the broadband gateways 102b-102n based on the negotiated common ASD. The broadband gateway 102a may communicate corresponding content for the one or more services to the broadband gateways 102b-102n via the established one or more corresponding communication links. The negotiated common ASD may comprise communication technology types, service provider preferences, security features, remote access, content processing capabilities, software platforms, protocols, applications and/or interfaces. The broadband gateway 102a may communicate information about gateway functionalities required for the one or more services to the broadband gateways 102b-102n. In this regard, the broadband gateway 102a may forward at least a portion of the gateway functionalities required for the one or more services to the broadband gateways 102b-102n. The forwarded gateway functionalities may be ported to the broadband gateways 102b-102n to support the one or more services. The broadband gateways 102b-102n may also be operable to perform gateway functionality conversion to support the gateway functionalities required for the one or more services. Depending on system configuration, the one or more services may be acquired from corresponding networks by the broadband gateway 102a and/or the broadband gateways 102b-102n. In instances where the services are acquired via the broadband gateway 102a, the broadband gateway 102a may receive corresponding content for the one or more services from networks. The received content may be communicated to the broadband gateways 102b-102n via the established one or more corresponding communication links. In this regard, the broadband gateway 102a may selectively communicate the received corresponding content to the broadband gateways 102b-102n based on location information for the broadband gateways 102b-102n. In instances where the services are acquired via the broadband gateways 102b-102n, the broadband gateways 102b-102n may receive corresponding content for the one or more services from networks utilizing the negotiated common ASD. The broadband gateways 102b-102n may communicate the received content to the broadband gateway 102a based on the negotiated common ASD.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for porting gateway functionality associated with a user from a first gateway to one or more other gateways.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a)

conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for networking, the method comprising:
   in a broadband gateway that enables communication with a plurality of devices including a first device, wherein said broadband gateway is configured to handle at least one physical layer connection to at least one network access service provider:
   negotiating, with said one or more other broadband gateways, a common authorized service domain for providing one or more services from said broadband gateway to the first device via said one or more other broadband gateways according to a comparison between security features of a first authorized service domain of said broadband gateway established with the at least one network access service provider, and a second authorized service domain of said one or more other broadband gateways established with the at least one network access service provider, said common authorized service domain comprising at least one security feature common between said first authorized service domain and said second authorized service domain for providing said one or more services, said at least one common security feature comprising applying a first set of security policy constraints determined for said common authorized service domain, to content communicated between said broadband gateway and said one or more other broadband gateways;
   establishing one or more communication links between said broadband gateway and said one or more other broadband gateways based on said common authorized service area; and
   selectively communicating, in accordance with said first set of security policy constraints determined for said common authorized service domain, content for said one or more services to said one or more other broadband gateways via said one or more communication links.

2. The method of claim 1, comprising negotiating at least one of communication technology types, service provider preferences, security features, remote access, content processing capabilities, software platforms, protocols, applications or interfaces.

3. The method according to claim 1, comprising communicating information about a gateway functionality for said one or more services to said one or more other broadband gateways.

4. The method according to claim 3, comprising forwarding at least one software structure interface or signaling protocol for said gateway functionality to said one or more other broadband gateways.

5. The method according to claim 1, further comprising:
   providing, via said broadband gateway without using said one or more other broadband gateways, access to content of a first service by said first device in accordance with said security features of said first authorized service domain of said broadband gateway; and
   detecting, by said broadband gateways, that said first device has roamed to said one or more other broadband gateways;
   wherein negotiating said common authorized service domain comprises negotiating said common authorized service domain responsive to detecting that said first device has roamed to said one or more other broadband gateways, said common authorized service domain allowing seamless access to said content of said first service via said one or more other broadband gateways by said first device.

6. The method according to claim 3, wherein said one or more other broadband gateways perform functionality conversion to support said gateway functionality for said one or more services.

7. The method according to claim 1, comprising:
   receiving said content for said one or more services from said at least one network access service provider;
   determining whether said content is related to a location of at least one of said broadband gateway or said one or more other broadband gateways; and
   responsive to determining that said content is related to said location, communicating said content to said one or more other broadband gateways via said one or more communication links.

8. The method according to claim 7, comprising selectively communicating said content to said one or more other broadband gateways via said one or more communication links based on location information for said one or more other broadband gateways.

9. The method according to claim 6, wherein said one or more other broadband gateways:
   receive other content for said one or more services from said at least one network access service provider; and
   communicate said other content to said broadband gateway via said one or more communication links based on said common authorized service area.

10. A system for networking, the system comprising:
    one or more circuits in a broadband gateway that enable communication with a plurality of devices including a first device, wherein said broadband gateway is configured to handle at least one physical layer connection to at least one network access service provider, said one or more circuits being configured to:
    negotiate, with said one or more other broadband gateways, a common authorized service domain for providing one or more services from said broadband gateway to the first device via said one or more other broadband gateways according to a comparison between security features of a first authorized service domain of said broadband gateway established with the at least one network access service provider, and a second authorized service domain of said one or more other broadband gateways established with the at least one network access service provider, said common authorized service domain comprising at least one security feature common between said first authorized service domain and said second authorized service domain for providing said one or more services, said at least one common security feature comprising applying a first set of security policy constraints determined for said common authorized service domain, to content communicated between said broadband gateway and said one or more other broadband gateways;

establish one or more communication links between said broadband gateway and said one or more other broadband gateways based on said common authorized service area; and selectively communicate, in accordance with said first set of security policy constraints determined for said common authorized service domain, content for said one or more services to said one or more other broadband gateways via said one or more communication links.

11. The system according to claim 10, wherein said one or more circuits is further configured to negotiate at least one of communication technology types, service provider preferences, security features, remote access, content processing capabilities, software platforms, protocols, applications, or interfaces.

12. The system according to claim 10, wherein said one or more circuits are configured to communicate information about a gateway functionality for said one or more services to said one or more other broadband gateways.

13. The system according to claim 12, wherein said one or more circuits are configured to forward at least one software structure interface or signaling protocol for said gateway functionality to said one or more other broadband gateways.

14. The system according to claim 13, wherein said one or more other broadband gateways are configured to port said gateway functionality for said one or more services.

15. The system according to claim 12, wherein said one or more other broadband gateways are configured to perform functionality conversion to support said gateway functionality for said one or more services.

16. The system according to claim 10, wherein said one or more circuits are configured to:
receive content for said one or more services from said at least one network access service provider;
determine whether said content is related to location information of said one or more other broadband gateways; and
responsive to determining that said content is related to said location information, communicate said content to said one or more other broadband gateways via said one or more communication links.

17. The system according to claim 16, wherein said one or more circuits are configured to selectively communicate said content to said one or more other broadband gateways via said one or more communication links based on location information for said one or more other broadband gateways.

18. The system according to claim 15, wherein said one or more other broadband gateways are configured to:
receive other content for said one or more services from said at least one network access service provider; and
communicate said other content to said broadband gateway via said one or more communication links based on said common authorized service area.

19. A method for networking, the method comprising:
in a broadband gateway configured to handle at least one physical layer connection to at least one network access service provider:
negotiating, with a visit broadband gateway, security features for a common authorized service domain by comparing security features of a first authorized service domain of said broadband gateway established with at least one network access service provider, and a second authorized service domain of said visit broadband gateway established with the at least one network access service provider, said common authorized service domain comprising at least one security feature common between said first authorized service domain and said second authorized service domain for providing said one or more services, said at least one common security feature comprising applying a first set of security policy constraints determined for said common authorized service domain, to content communicated between said broadband gateway and said one or more other broadband gateways;
establishing one more communication links between said broadband gateway and said visit broadband gateway; and
selectively communicating, in accordance with said first set of security policy constraints determined for said common authorized service domain, content related to one or more services to said visit broadband gateway via said one or more communication links.

20. The method of claim 19, comprising negotiating, with a second visit broadband gateway, security features for a second common authorized service area by comparing security features of said broadband gateway and said second visit broadband gateway.

* * * * *